United States Patent
Kim et al.

(10) Patent No.: US 11,136,045 B2
(45) Date of Patent: Oct. 5, 2021

(54) COOPERATIVE CONTROL METHOD AND APPARATUS FOR MAINTAINING DRIVING IN RESPONSE TO ENGINE CLUTCH FAILURE

(71) Applicants: Hyundai Motor Company, Seoul (KR); Kia Motors Corporation, Seoul (KR)

(72) Inventors: Yong Hyun Kim, Gyeonggi-do (KR); Yeon Bok Kim, Gyeonggi-do (KR); Hyeon Jun Kim, Gyeonggi-do (KR); Kyung Su Kim, Chungcheongnam-do (KR); Sok Young Yun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 305 days.

(21) Appl. No.: 16/435,956

(22) Filed: Jun. 10, 2019

(65) Prior Publication Data

US 2020/0180654 A1    Jun. 11, 2020

(30) Foreign Application Priority Data

Dec. 7, 2018    (KR) .......................... 10-2018-0157191

(51) Int. Cl.
*B60W 50/029*    (2012.01)
*B60W 10/02*    (2006.01)
*B60W 20/40*    (2016.01)

(52) U.S. Cl.
CPC .......... *B60W 50/029* (2013.01); *B60W 10/02* (2013.01); *B60W 20/40* (2013.01); *B60W 2050/0292* (2013.01)

(58) Field of Classification Search
CPC .... B60W 50/029; B60W 10/02; B60W 20/40; B60W 2050/0292; B60W 2510/0676; B60W 2555/20; B60W 2510/02; B60W 10/06; B60W 10/08; B60W 10/30; B60W 20/50; Y02T 10/62; B60K 2006/4825; B60K 6/44
See application file for complete search history.

(56) References Cited

U.S. PATENT DOCUMENTS

2017/0166182 A1*   6/2017   Kim ..................... B60W 10/02
2019/0135269 A1*   5/2019   Suzuki .................. B60K 6/48

* cited by examiner

*Primary Examiner* — Marthe Y Marc-Coleman
(74) *Attorney, Agent, or Firm* — Mintz Levin Cohn Ferris Glovsky and Popeo, P.C.; Peter F. Corless (57) ABSTRACT

A cooperative control method and apparatus for maintaining driving in response to engine clutch failure are provided. The cooperative control method includes monitoring refill temperature conditions of operating oil of an engine clutch and performing cooperative control between a radiator and an engine cooling water circulation pump based on change in temperature of the operating oil of the engine clutch. Additionally, the method includes determining whether the engine clutch is in a refill dangerous stage and turning off an engine to be turned off when the engine clutch is in the refill dangerous stage. Whether the temperature of the operating oil is mitigated is determined based on the refill temperature conditions, when the engine is turned off and oil refilling is performed when the temperature of the operating oil is not mitigated.

19 Claims, 4 Drawing Sheets

| RADIATOR IS OPERATED (AT CHANGE OF TEMP. OF OPERATING OIL OF ENGINE CLUTCH AFTER PREVIOUS REFILLING) | OUTDOOR TEMP. > ENGINE ROOM (TEMP.) | | | | | OUTDOOR TEMP. < ENGINE ROOM (TEMP.) | | | | | NOTE |
|---|---|---|---|---|---|---|---|---|---|---|---|
| | △10℃ | △20℃ | △30℃ | △40℃ | △50℃ | △10℃ | △20℃ | △30℃ | △40℃ | △50℃ | |
| RISE OF TEMP. OF OPERATING OIL OF ENGINE CLUTCH (AS COMPARED TO PREVIOUS TEMP.) | NOT OPERATED | | | | | 1000 rpm | 3000 rpm | 5000 rpm | MAX | MAX | ENGINE IS TURNED OFF AND EV DRIVING IS PERFORMED WHEN TEMP. DIFFERENCE REACHES △50℃ |
| DROP OF TEMP. OF OPERATING OIL OF ENGINE CLUTCH (AS COMPARED TO PREVIOUS TEMP.) | 1000 rpm | 3000 rpm | 5000 rpm | MAX | MAX | NOT OPERATED | | | | | |

COOPERATIVE CONTROL METHOD AND APPARATUS FOR MAINTAINING DRIVING IN RESPONSE TO ENGINE CLUTCH FAILURE

CROSS-REFERENCED TO RELATED APPLICATION(S)

This application claims the benefit of Korean Patent Application No. 10-2018-0157191, filed on Dec. 7, 2018, which is hereby incorporated by reference as if fully set forth herein.

BACKGROUND

Field of the Invention

The present invention relates to a cooperative control method and apparatus for maintaining driving in response to engine clutch failure, and more particularly, to a cooperative control method and apparatus in which a control operation is performed to more effectively drive a vehicle when an engine clutch fails.

Discussion of the Related Art

In a transmission mounted electric device (TMED) structure of a conventional parallel hybrid electric vehicle (HEV), an engine clutch connects power between an engine and a motor. A hybrid electric vehicle (HEV) employs a dry clutch system, and a type in which an engine clutch is closed to connect power between an engine and a motor when power of the vehicle is turned off may be used. In the engine clutch, when an actuator pushes a piston, a brake operating oil filling the inside of a cylinder generates hydraulic pressure, the generated hydraulic pressure pushes a diaphragm spring of the engine clutch and thus the engine clutch may be opened.

Therefore, the conventional engine clutch system is applied to a cooperative control method and apparatus for maintaining driving in response to normal close failure. However, in the event of failure of the actuator, a motor of the actuator is fixed at a point in time of the failure and, thus, the state of the engine clutch is fixed.

SUMMARY

Accordingly, the present invention provides a cooperative control method and apparatus for maintaining driving in response to engine clutch failure. In particular, an object of the present invention is to provide a cooperative control method and apparatus for maintaining driving in response to engine clutch failure in which a control operation to more effectively drive a vehicle when an engine clutch fails is performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with the purpose of the invention, a cooperative control method for maintaining driving of a vehicle in response to engine clutch failure may include monitoring refill temperature conditions of operating oil of an engine clutch, performing cooperative control between a radiator and an engine cooling water circulation pump based on change in temperature of the operating oil of the engine clutch, determining whether the engine clutch is in a refill dangerous stage, turning off an engine in response to determining that the engine clutch is in the refill dangerous stage, determining whether the temperature of the operating oil is mitigated based on the refill temperature conditions, when the engine is turned off, and performing refilling of the operating oil, in response to determining that the temperature of the operating oil is not mitigated.

The cooperative control method may further include operating the vehicle to perform electric vehicle (EV) driving, in response to determining that the engine clutch is not in the refill dangerous stage. Additionally, the method may include starting up the engine in response to determining that the temperature of the operating oil is mitigated.

The performing of the cooperative control between the radiator and the engine cooling water circulation pump based on change in the temperature of the operating oil of the engine clutch may include determining whether the cooperative control between the radiator and the engine cooling water circulation pump is performed based on an outdoor temperature and a temperature of an engine room, when the temperature of the operating oil of the engine clutch is increased compared to a previous temperature.

The determination of whether the cooperative control between the radiator and the engine cooling water circulation pump is performed based on the outdoor temperature and the temperature of the engine room, when the temperature of the operating oil of the engine clutch is increased compared to the previous temperature, may include not performing the cooperative control between the radiator and the engine cooling water circulation pump when the temperature of the engine room is less than the outdoor temperature, and performing the cooperative control between the radiator and the engine cooling water circulation pump when the temperature of the engine room is greater than the outdoor temperature.

The performing of the cooperative control between the radiator and the engine cooling water circulation pump when the temperature of the engine room is greater than the outdoor temperature may include operating the radiator and the engine cooling water circulation pump at predetermined RPMs, when a difference between the temperature of the engine room and the outdoor temperature is within a predetermined temperature. In addition, the performing of the cooperative control between the radiator and the engine cooling water circulation pump based on change in the temperature of the operating oil of the engine clutch may include determining whether the cooperative control between the radiator and the engine cooling water circulation pump is performed based on an outdoor temperature and a temperature of an engine room, when the temperature of the operating oil of the engine clutch is decreased compared to a previous temperature.

Further, the determination of whether the cooperative control between the radiator and the engine cooling water circulation pump is performed based on the outdoor temperature and the temperature of the engine room, when the temperature of the operating oil of the engine clutch is decreased compared to the previous temperature, may include performing the cooperative control between the radiator and the engine cooling water circulation pump when the temperature of the engine room is less than the outdoor temperature, and not performing the cooperative control between the radiator and the engine cooling water circulation pump, when the temperature of the engine room is greater than the outdoor temperature. In other words, the controller may be configured to maintain a current state of the radiator and engine cooling water circulation pump.

The performing of the cooperative control between the radiator and the engine cooling water circulation pump when the temperature of the engine room is less than the outdoor temperature may include operating the radiator and the engine cooling water circulation pump at predetermined RPMs, when a difference between the temperature of the engine room and the outdoor temperature is within a predetermined temperature.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. In the following description of the exemplary embodiments, it will be understood that, when positional relations are expressed, for example, when an element is "on" or "under" or "in front of" or "behind" another element, the two elements may directly contact each other, or one or more other elements may be interposed between the two elements.

In addition, in the following description of elements in the present invention, the terms "first", "second", "A", "B", "(a)", "(b)", etc. may be used. It will be understood that these terms are used only to discriminate one element from other elements, and do not limit the nature, sequence or order of the corresponding element. In the following description of the embodiments, it will be understood that, when an element is "connected to", "coupled to" or "combined with" another element, the element may be directly connected or coupled to the other element, or one or more other elements may be interposed between the two elements.

All terms including technical or scientific terms have the same meanings as generally understood by those skilled in the art to which the present invention pertains, unless defined otherwise. In the following description of the embodiments, generally used terms, such as terms defined in dictionaries, will be interpreted as having meanings coinciding with contextual meanings in the related art, and are not to be interpreted as having ideal or excessively formal meanings, unless defined clearly.

The present invention may provide a cooperative control method for maintaining driving of a vehicle in response to engine clutch failure, in which the state of an engine clutch to perform a refilling operation during EV driving may be monitored, and, when the engine clutch enters a refill necessary stage, difficulty in entering a refill dangerous stage or a refill performing stage may be avoided through cooperative control between a radiator and an engine cooling water circulation pump.

Figure 1:
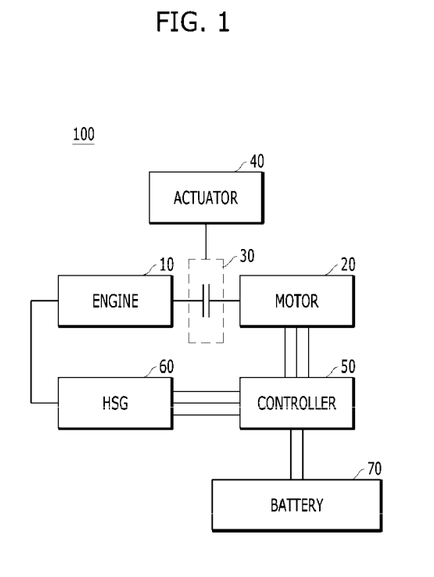
FIG. 1 is a block diagram of a vehicle in accordance with an exemplary embodiment of the present invention.

FIG. 1 is a block diagram of a vehicle in accordance with an exemplary embodiment of the present invention. Referring to FIG. 1, a vehicle 100 may include an engine 10, a motor 20, an engine clutch 30, an actuator 40, a controller 50, a hybrid starter generator (HSG) 60 and a battery 70.

The engine 10 may be configured to generate power by combusting fuel. The engine 10 may include a temperature sensor (not shown) configured to detect the temperature of an engine room. The temperature of the engine 10 may be adjusted by operation of a radiator and engine cooling water. The motor 20 may be configured to assist power of the engine 10, and may be operated as a generator to generate electric energy during braking or deceleration. The electric energy generated by the motor 20 may be stored in the battery 70. The motor 20 may have a plurality of motor characteristics according to motor driving control. Acceleration performance and fuel efficiency of the vehicle 100 may be determined based on the respective characteristics of the motor 20.

The engine clutch 30 may be disposed between the engine 10 and the motor 20 driving the vehicle 100. Based on whether the engine clutch 30 is closed or opened, power output from the engine 10 may assist driving of the motor 20 and thus the vehicle 100 may be driven using both the engine 10 and the motor 20, or the vehicle 100 may be driven using only driving power of the motor 20.

The actuator 40 may be configured to close or open the engine clutch 30 by adjusting pressure P of operating oil, and the driving of the actuator 40 may be adjusted based on control instructions from the controller 50. A position of the piston in the forward and backward directions may be adjusted based on the control instructions, and the pressure P of the operating oil supplied to the engine clutch 30 may be adjusted by forward or backward movement of the piston to the position based on the control instructions.

The controller 50 may be configured to receive operating state information of the actuator 40 and determine that the engine clutch 30 is in a closed state when the actuator 40 is not operated. Additionally, and the controller 50 may be configured to determine that the engine clutch 30 is in an open state when the actuator 40 is operated. The controller 50 may also be configured to operate the actuator 40 to perform a refilling operation of the operating oil of the engine clutch 30.

The controller 50 may be configured to monitor refill temperature conditions of the actuator 40 by receiving the temperature of the operating oil of the engine clutch 30 and thus determining a temperature change, and by receiving the temperature of the engine room and thus determining a temperature change. The controller 50 may be configured to perform cooperative control between the radiator and an engine cooling water circulation pump based on the temperature of the operating oil of the engine clutch 30 and the temperature of the engine room.

Further, the controller 50 may be configured to operate the radiator and the engine cooling water circulation pump at predetermined RPMs that correspond to a difference between the temperature of the engine room and outdoor temperature. Such an operation of cooperative control between the radiator and the engine cooling water circulation pump will be described in detail referring to FIG. 3 below. The controller 50 may further be configured to determine whether the engine clutch 30 is in a refill dangerous stage based on the temperature of the operating oil of the engine clutch 30 and the temperature of the engine room. In other words, the refill dangerous stage may be considered a state in which the temperature of the engine room is greater than a predetermined temperature, such a temperature resulting in a dangerous condition for performing EV driving.

For example, the controller 50 may be configured to turn off the engine 10 in response to determining that the engine clutch 30 is in the refill dangerous stage. The controller 50 may be configured to operate the vehicle 100 to perform EV driving in response to determining that the engine clutch 30 is not in the refill dangerous stage. The controller 50 may then be configured to determine whether the refill temperature conditions are mitigated in response to the temperature of the operating oil of the engine clutch 30 and the temperature of the engine room. For example, after the engine 10 is turned off, the controller 50 may be configured to determine whether the temperature of the engine room is equal to or less than a predetermined value (e.g., the difference between the engine room temperature and the outside air temperature may be within about 3 degrees).

Particularly, if the temperature of the engine room is greater than the predetermined value, the controller 50 may be configured to operate the engine clutch 30 to be refilled with the operating oil. In contrast, if the temperature of the engine room is equal to or less than the predetermined value, the controller 50 may be configured to turn off the engine 10. The HSG 60 may be configured to start the engine 10, or perform power generation by rotational force of the engine 10. The high voltage battery 70 may be provided to be rechargeable, and may be charged while performing power generation.

Figure 2:
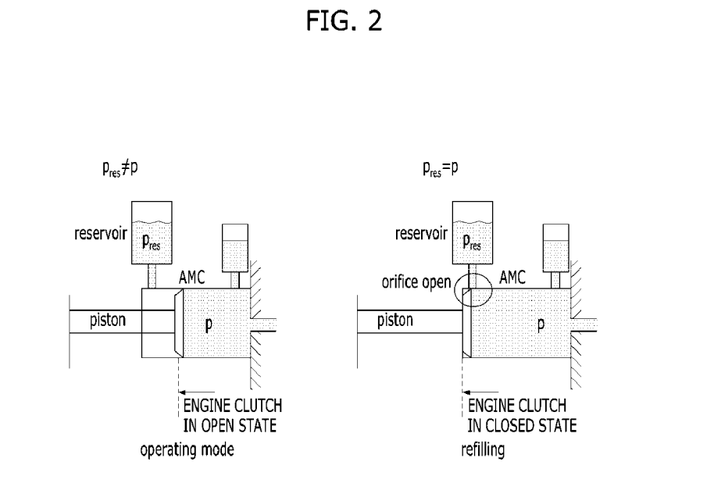
FIG. 2 is a view illustrating an operating oil refilling operation of an actuator for an engine clutch in accordance with an exemplary embodiment of the present invention.

FIG. 2 is a view illustrating the oil refilling operation of the actuator for the engine clutch in accordance with an exemplary embodiment of the present invention. Referring to FIG. 2, when the vehicle 100 is a hybrid electric vehicle (HEV), power transmission or release between the motor 20 and the engine 10 may be performed by operating the engine clutch 30. When the engine clutch 30 is operated using the pressure P of operating oil through the actuator 40 in a dry engine clutch system, the engine clutch 30 may require a refilling operation.

The refiling operation may be an operation in which, if the state of the engine clutch 30 is changed as the operating oil within the engine clutch 30 expands and contracts according to temperature change and in response to failure of the engine clutch 30, the operating oil within the engine clutch 30 joins operating oil in a reservoir and thus maintains a constant state. For this purpose, the controller 50 may be configured to operate the actuator 40 to move the piston backwards, an orifice may be opened to thus connect an inner space of a cylinder and the reservoir, and the operating oil stored in the reservoir may be supplied to the cylinder through the orifice, thus performing operating oil refilling.

In particular, when the vehicle 100 is an HEV in a normal state, cooperative control for maintaining driving in response to engine clutch failure may be frequently performed. However, when the vehicle 100 is a plug-in hybrid electric vehicle (PHEV), electric vehicle (EV) driving may be performed for a substantial period of time under the open state of the engine clutch 30 and, thus, if the engine clutch 30 requires operating oil refilling, problems may occur. For example, when stuck-open failure of the engine clutch 30 occurs and the vehicle 100 is continuously driven in the stuck-open state of the engine clutch 30, the state of the engine clutch 30 is changed and thus causing secondary burn-out of engine clutch hardware and sudden power connection between the engine 10 and the motor 20, and thereby start of the vehicle 100 may occur.

Figure 3:
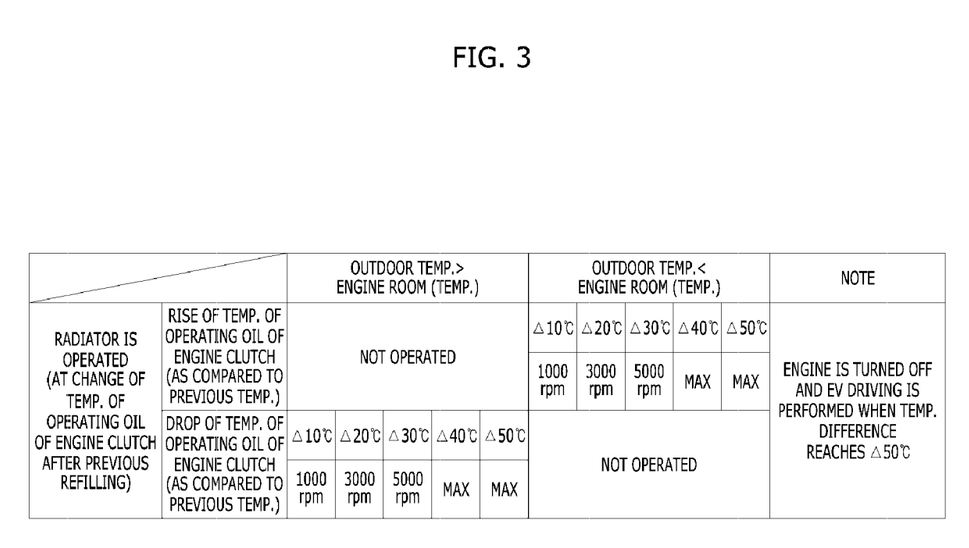
FIG. 3 is a table illustrating a control map for cooperative control in accordance with an exemplary embodiment of the present invention.

FIG. 3 is a table illustrating a control map for cooperative control in accordance with an exemplary embodiment of the present invention. Referring to FIG. 3, in response to determining that the engine clutch 30 is stuck open, the controller 50 may be configured to determine the stuck-open failure of the engine clutch 30 based on temperature increase and decrease of the engine room and change in the temperature of the operating oil of the engine clutch 30 according to surrounding environments through cooperative control for maintaining driving. Thereafter, cooperative control between the radiator and the engine cooling water circulation pump may be performed.

The operation of the radiator may include a state in which the temperature of the operating oil of the engine clutch 30 is increased compared to the previous temperature, and a state in which the temperature of the operating oil of the engine clutch 30 is decreased compared to the previous temperature. When the temperature of the operating oil of the engine clutch 30 is increased compared to the previous temperature and outdoor temperature is less than the temperature of the engine room, the radiator and the engine cooling water circulation pump may be operated by cooperative control.

For example, when the temperature of the engine room is greater than the outdoor temperature by about 10° C., the radiator may be operated at about 1,000 RPM. When the temperature of the engine room is greater than the outdoor temperature by about 20° C., the radiator may be operated at about 3,000 RPM. Additionally, when the temperature of the engine room is greater than the outdoor temperature by about 30° C., the radiator may be operated at about 5,000 RPM. When the temperature of the engine room is greater than the outdoor temperature by about 40° C., the radiator may be operated at a predetermined maximum RPM (e.g., about 5,500 RPM with a minimum RPM being about 1000 RPM). When the temperature of the engine room is greater than the outdoor temperature by about 50° C., the radiator may be operated at the predetermined maximum RPM.

Further, when the temperature of the operating oil of the engine clutch 30 is increased compared to the previous temperature and the outdoor temperature is greater than the temperature of the engine room, the radiator and the engine cooling water circulation pump may not be operated by cooperative control. In contrast, when the temperature of the operating oil of the engine clutch 30 is decreased compared to the previous temperature and the outdoor temperature is greater than the temperature of the engine room, the radiator and the engine cooling water circulation pump may be operated by cooperative control.

For example, when the temperature of the engine room is less than the outdoor temperature by about 10° C., the radiator may be operated at about 1,000 RPM. When the temperature of the engine room is less than the outdoor temperature by about 20° C., the radiator may be operated at about 3,000 RPM. When the temperature of the engine room is less than the outdoor temperature by about 30° C., the radiator may be operated at about 5,000 RPM. Additionally, when the temperature of the engine room is less than the outdoor temperature by about 40° C., the radiator may be operated at the predetermined maximum RPM. When the temperature of the engine room is less than the outdoor temperature by about 50° C., the radiator may be operated at the predetermined maximum RPM. When the temperature of the operating oil of the engine clutch 30 is decreased compared to the previous temperature and the outdoor temperature is less than the temperature of the engine room, the radiator and the engine cooling water circulation pump may not be operated by cooperative control.

Figure 4:
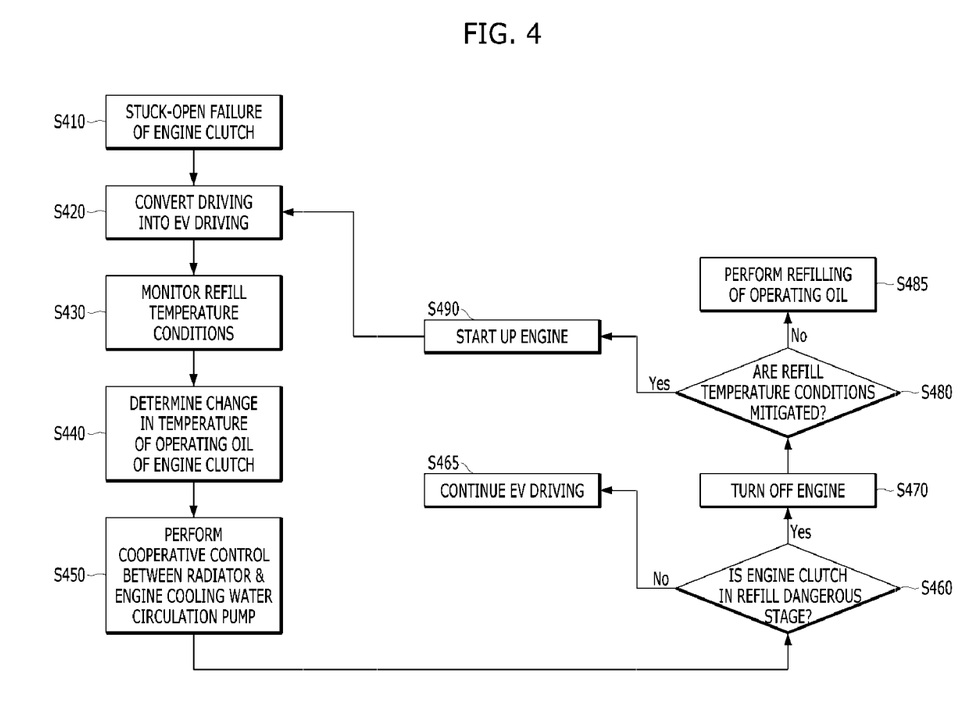
FIG. 4 is a flowchart illustrating a cooperative control method for maintaining driving in response to engine clutch failure in accordance with an exemplary embodiment of the present invention.

FIG. 4 is a flowchart illustrating a cooperative control method for maintaining driving in response to engine clutch failure in accordance with an exemplary embodiment of the present invention. Referring to FIG. 4, when stuck-open failure of the engine clutch 30 is detected, driving of the vehicle 100 may be converted into EV driving (Operations S410 and S420).

After operation S420, the controller 50 may be configured to monitor refill temperature conditions (Operation S430). After Operation S430, the controller 50 may be configured to determine change in the temperature of the operating oil of the engine clutch 30 (Operation S440). After Operation S440, the controller 50 may be configured to perform cooperative control between the radiator and the engine cooling water circulation pump based on the temperature of the operating oil of the engine clutch 30 (Operation S450).

Additionally, after Operation S450, the controller 50 may be configured to determine whether the engine clutch 30 is in a refill dangerous stage (Operation S460). In response to determining that the engine clutch 30 is in the refill dangerous stage in Operation S460, the controller 50 may be configured to turn off the engine 10 (Operation S470). In contrast, in response to determining that the engine clutch 30 is not in the refill dangerous stage in Operation S460, the controller 50 may be configured to operate the vehicle 100 to continue to perform EV driving (Operation S475).

After Operation S470, the controller 50 may be configured to determine whether the refill temperature conditions are mitigated (Operation S480). In response to determining that the refill temperature conditions are mitigated in Operation S480, the controller 50 may be configured to start up the engine 10 (Operation S490). When the engine 10 is started, the controller 50 may be configured to perform Operation S420. In response to determining that the refill temperature conditions are not mitigated in Operation S480, the controller 50 may be configured to operate the actuator 40 to perform refilling of the operating oil (Operation S485). The controller 50 may also be configured to operate the vehicle 100 to be in a shut-down state, when refilling of the operating oil is performed.

The above-described method in accordance with an exemplary embodiment may be recorded as a program which may be executed in computers and be stored in a non-transitory computer readable recording medium and, for example, non-transitory computer readable recording media may include a ROM, a RAM, a CD-ROM, a magnetic tape, a floppy disk, an optical data storage device, etc. The non-transitory computer readable recording media may be distributed to computer systems connected by a network and, herein, computer readable code may be stored and executed in a distributed manner. Further, functional programs, code and code segments to implement the above-described method may be easily deduced by programmers in the art to which the embodiments pertain.

As is apparent from the above description, effects of a cooperative control method and apparatus for maintaining driving in response to engine clutch failure will be described below. First, when an engine clutch is stuck open and series driving is performed, secondary burn-out of the engine clutch and unintentional start of a vehicle may be prevented. Second, problems, which may occur when the engine clutch continuously maintains an open state during series driving, may be monitored through the temperature of operating oil and an oil refilling operation, and driving performance of the vehicle may be secured through cooperative control between a radiator and an engine cooling water circulation pump.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A cooperative control method for maintaining driving of a vehicle in response to engine clutch failure, comprising:
monitoring, by a controller, refill temperature conditions of operating oil of an engine clutch;
performing, by the controller, cooperative control between a radiator and an engine cooling water circulation pump based on change in temperature of the operating oil of the engine clutch;
determining, by the controller, whether the engine clutch is in a refill dangerous stage;
turning off, by the controller, an engine in response to determining that the engine clutch is in the refill dangerous stage;
determining, by the controller, whether the temperature of the operating oil is mitigated based on the refill temperature conditions, when the engine is turned off; and
performing, by the controller, refilling of the operating oil, in response to determining that the temperature of the operating oil is not mitigated.

2. The cooperative control method according to claim 1, further comprising:
operating, by the controller, the vehicle to perform electric vehicle (EV) driving in response to determining that the engine clutch is not in the refill dangerous stage.

3. The cooperative control method according to claim 1, further comprising:
starting, by the controller, the engine in response to determining that the temperature of the operating oil is mitigated.

4. The cooperative control method according to claim 1, wherein the performing of the cooperative control between the radiator and the engine cooling water circulation pump based on change in the temperature of the operating oil of the engine clutch includes:
determining, by the controller, whether the cooperative control between the radiator and the engine cooling water circulation pump is performed based on an outdoor temperature and a temperature of an engine room, when the temperature of the operating oil of the engine clutch is increased compared to a previous temperature.

5. The cooperative control method according to claim 4, wherein the determining of whether the cooperative control between the radiator and the engine cooling water circulation pump is performed based on the outdoor temperature and the temperature of the engine room, when the temperature of the operating oil of the engine clutch is increased compared to the previous temperature, includes:
maintaining, by the controller, a current state of the radiator and the engine cooling water circulation pump, when the temperature of the engine room is less than the outdoor temperature; and
performing, by the controller, the cooperative control between the radiator and the engine cooling water circulation pump, when the temperature of the engine room is greater than the outdoor temperature.

6. The cooperative control method according to claim 5, wherein the performing of the cooperative control between the radiator and the engine cooling water circulation pump, when the temperature of the engine room is greater than the outdoor temperature, includes:
operating, by the controller, the radiator and the engine cooling water circulation pump at predetermined RPMs when a difference between the temperature of the engine room and the outdoor temperature is within a predetermined temperature.

7. The cooperative control method according to claim 1, wherein the performing of the cooperative control between the radiator and the engine cooling water circulation pump based on change in the temperature of the operating oil of the engine clutch includes:
determining, by the controller, whether the cooperative control between the radiator and the engine cooling water circulation pump is performed based on an outdoor temperature and a temperature of an engine room, when the temperature of the operating oil of the engine clutch is decreased compared to a previous temperature.

8. The cooperative control method according to claim 7, wherein the determining of whether the cooperative control between the radiator and the engine cooling water circulation pump is performed based on the outdoor temperature and the temperature of the engine room, when the temperature of the operating oil of the engine clutch is decreased compared to the previous temperature, includes:
performing, by the controller, the cooperative control between the radiator and the engine cooling water circulation pump, when the temperature of the engine room is less than the outdoor temperature; and
maintaining, by the controller, a current state of the radiator and the engine cooling water circulation pump, when the temperature of the engine room is greater than the outdoor temperature.

9. The cooperative control method according to claim 8, wherein the performing of the cooperative control between the radiator and the engine cooling water circulation pump, when the temperature of the engine room is less than the outdoor temperature, includes:
operating, by the controller, the radiator and the engine cooling water circulation pump at predetermined RPMs when a difference between the temperature of the engine room and the outdoor temperature is within a predetermined temperature.

10. A non-transitory computer readable recording medium having a program recorded therein to implement the cooperative control method according to claim 1.

11. A cooperative control apparatus for maintaining driving of a vehicle in response to engine clutch failure, comprising:
an engine clutch;
an actuator configured to adjust a pressure of operating oil of the engine clutch; and
a controller configured to:
monitor refill temperature conditions of the operating oil of the engine clutch;
perform cooperative control between a radiator and an engine cooling water circulation pump based on change in temperature of the operating oil of the engine clutch;
determine whether the engine clutch is in a refill dangerous stage;
turn off an engine in response to determining that the engine clutch is in the refill dangerous stage;

determine whether the temperature of the operating oil is mitigated based on the refill temperature conditions when the engine is turned off; and perform refilling of the operating oil in response to determining that the temperature of the operating oil is not mitigated.

12. The cooperative control apparatus according to claim 11, wherein the controller is configured to operate the vehicle to perform electric vehicle (EV) driving in response to determining that the engine clutch is not in the refill dangerous stage.

13. The cooperative control apparatus according to claim 11, wherein the controller is configured to start the engine in response to determining that the temperature of the operating oil is mitigated.

14. The cooperative control apparatus according to claim 11, wherein the controller is configured to determine whether the cooperative control between the radiator and the engine cooling water circulation pump is performed based on an outdoor temperature and a temperature of an engine room, when the temperature of the operating oil of the engine clutch is increased compared to a previous temperature.

15. The cooperative control apparatus according to claim 14, wherein the controller is configured to:
maintain a current state of the radiator and the engine cooling water circulation pump, when the temperature of the engine room is less than the outdoor temperature; and
perform the cooperative control between the radiator and the engine cooling water circulation pump, when the temperature of the engine room is greater than the outdoor temperature.

16. The cooperative control apparatus according to claim 15, wherein the controller is configured to operate the radiator and the engine cooling water circulation pump at predetermined RPMs when a difference between the temperature of the engine room and the outdoor temperature is within a predetermined temperature.

17. The cooperative control apparatus according to claim 11, wherein the controller is configured to determine whether the cooperative control between the radiator and the engine cooling water circulation pump is performed based on an outdoor temperature and a temperature of an engine room, when the temperature of the operating oil of the engine clutch is decreased compared to a previous temperature.

18. The cooperative control apparatus according to claim 17, wherein the controller is configured to:
perform the cooperative control between the radiator and the engine cooling water circulation pump, when the temperature of the engine room is less than the outdoor temperature; and
maintain a current state of the radiator and the engine cooling water circulation pump, when the temperature of the engine room is greater than the outdoor temperature.

19. The cooperative control apparatus according to claim 18, wherein the controller is configured to operate the radiator and the engine cooling water circulation pump at predetermined RPMs when a difference between the temperature of the engine room and the outdoor temperature is within a predetermined temperature.

* * * * *